Sept. 12, 1961 N T NICHOLS, JR 2,999,349
GRASS AND WEED DEFLECTING ATTACHMENT FOR COTTON PICKERS
Filed Feb. 1, 1960 3 Sheets—Sheet 3

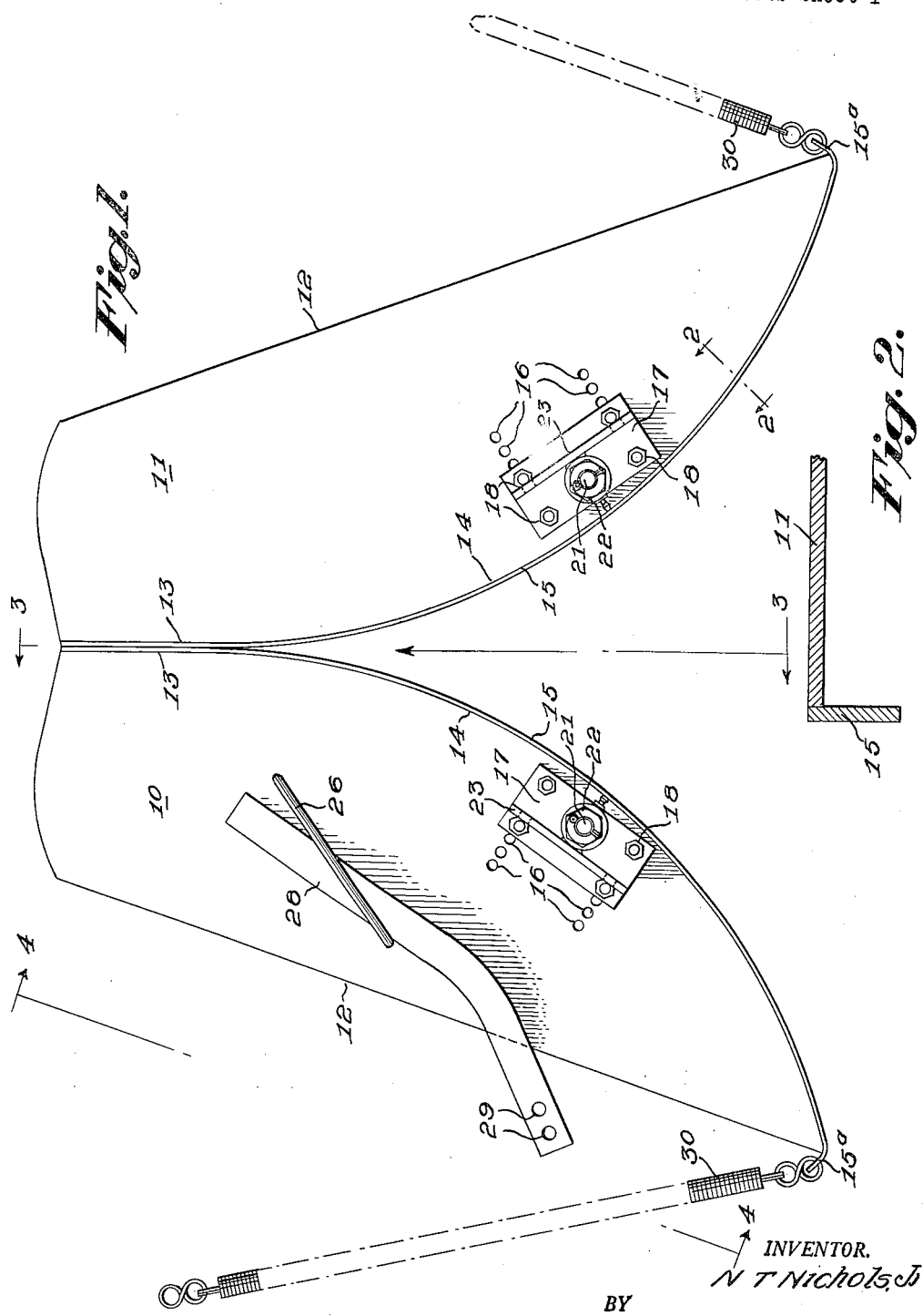

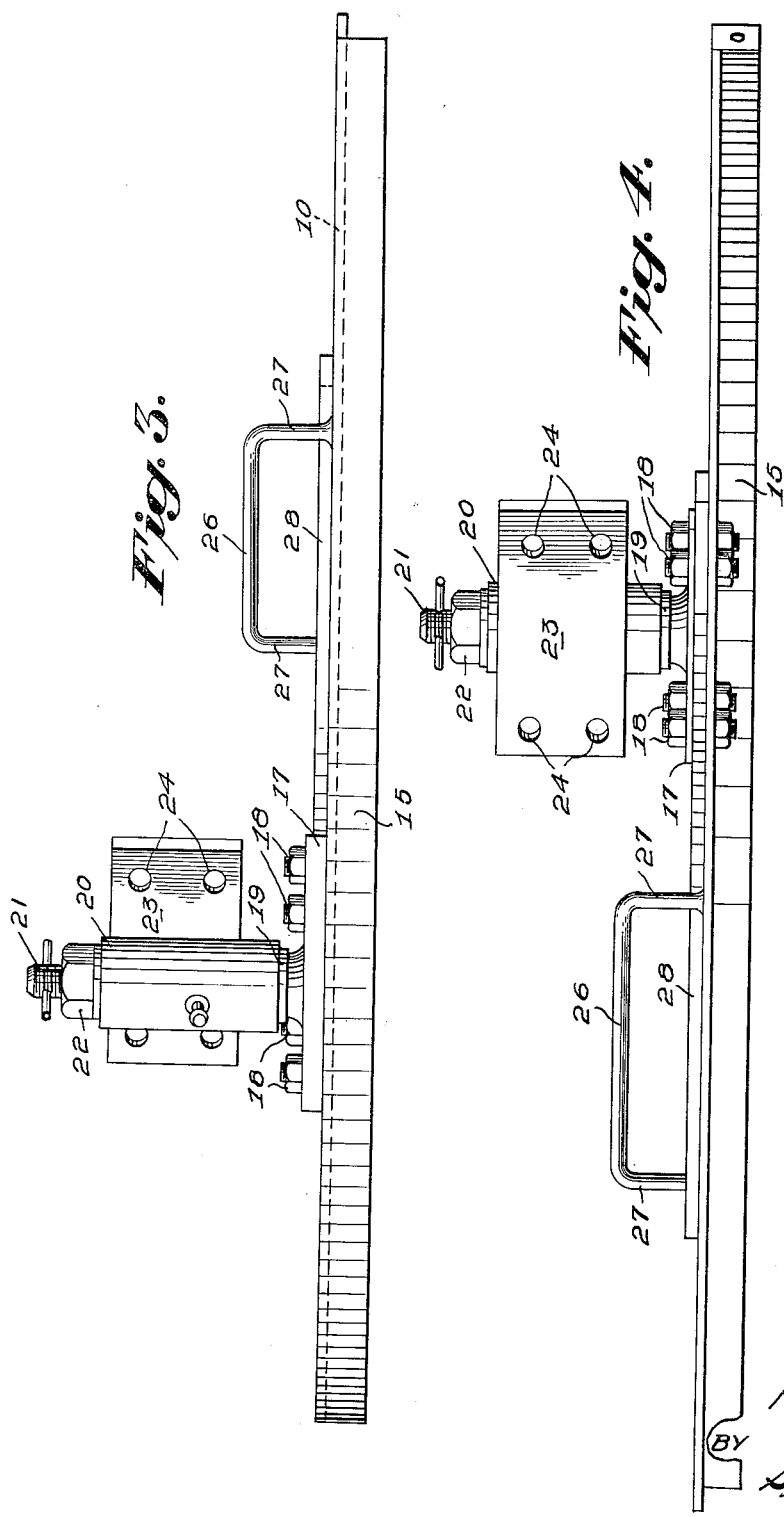

INVENTOR.
N T Nichols, Jr.
BY
Stone & Mack,
ATTORNEYS.

United States Patent Office 2,999,349
Patented Sept. 12, 1961

2,999,349
GRASS AND WEED DEFLECTING ATTACHMENT FOR COTTON PICKERS
N T Nichols, Jr., P.O. Box 1463, Belzoni, Miss.
Filed Feb. 1, 1960, Ser. No. 6,006
5 Claims. (Cl. 56—28)

This invention relates to a grass and weed deflecting attachment for cotton pickers.

As is known by persons engaged in cotton raising, a major problem which is encountered in the mechanical picking of the cotton is the separation of grass and weeds therefrom. If grass, weeds, leaves or other vegetation is harvested with the cotton, it is almost impossible to separate same from the cotton since vegetation adheres tightly to the cotton fibers and is very difficult to separate therefrom.

Accordingly, a primary feature of the present invention is an attachment for a standard cotton picker which effectively presses down grass, weeds, and other vegetation in advance of the cotton picker and thereby prevents entry thereof into the head of the cotton picker.

A further feature of the invention is a cotton picker attachment which functions as an efficient cotton stalk guide whereby the stalks are guided all the way through the cotton picking head.

A still further feature of the invention is an attachment which in addition to its function of pressing down grass, weeds and other vegetation, also functions to catch cotton dropped from the the picker whereby same is carried along with air carrying picked cotton into the receiving hopper for same.

A still further feature of the invention is a grass and weed deflecting attachment for a cotton picker which is of relatively simple construction, and which is highly efficient in use.

Other features and advantages of the invention will become apparent in the course of the following detailed description, taken in connection with the accompanying drawings, wherein:

FIG. 1 is a top plan view of the improved attachment with a portion of same being broken away;

FIG. 2 is an enlarged fragmental vertical sectional view as observed in the plane of line 2—2 on FIG. 1;

FIG. 3 is an enlarged side elevational view of the attachment as observed in the plane of line 3—3 on FIG. 1;

FIG. 4 is an enlarged side elevational view of the attachment as observed in the plane of line 4—4 on FIG. 1;

Figure 5:
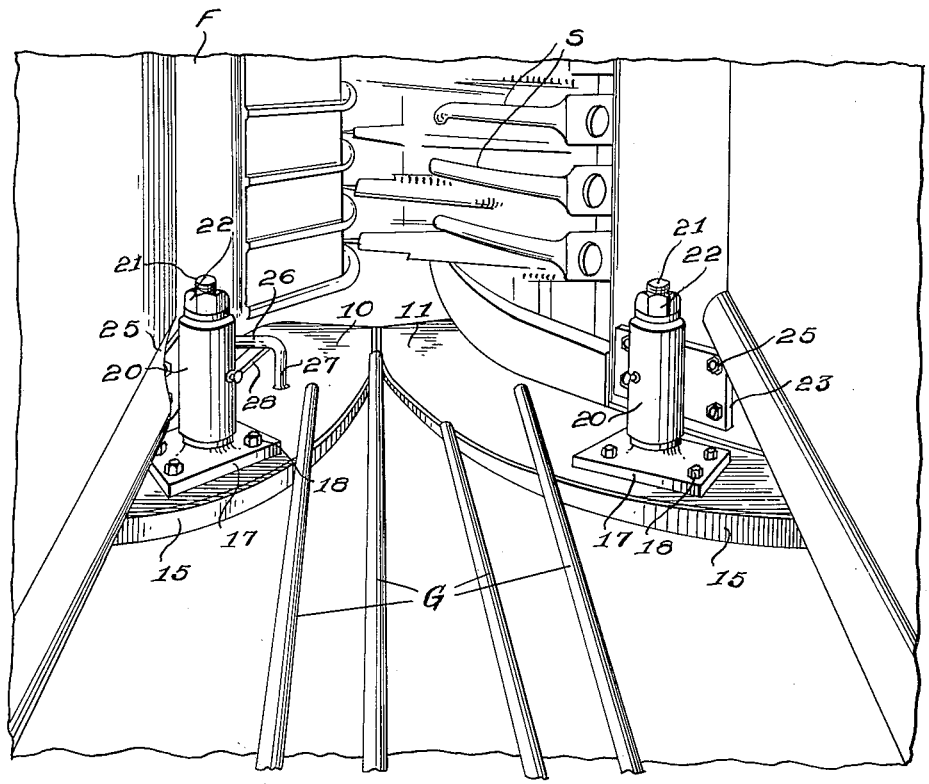
FIG. 5 is a perspective view showing the attachment as being secured to a cotton picking machine.

Referring now in detail to the drawings, the improved attachment will be seen to comprise a pair of plates, a right hand one 10 and a left hand one 11 which as shown in FIG. 1 are of like size and contour and each thereof has an outer straight edge 12 and an inner edge comprising a relatively short straight portion 13 and a relatively long curved portion 14 and which curved portions are convex relative to a central straight line.

A band of strap iron 15 is secured as by welding to the said straight and curved edge portions 13 and 14 with the upper edge thereof flush with the upper faces of plates 10 and 11 as is indicated in FIG. 2, and which function to engage and press down grass and weeds while the cotton stalks are guided by same and directed to the cotton picking head between the straight inner portions of the bands 15.

Each plate 10 and 11 is provided with two sets of apertures 16 and a bracket plate 17 is secured to each plate 10, 11 as by means of four bolts 18 which are selectively received in four of the plurality of apertures 16.

Each bracket plate 17 is provided with a vertical bearing spindle 19 which is rotatably received in a bearing bushing 20 and is removably retained therein as by means of a bolt 21 and nut 22. Each of the bearing bushings 20 is provided with a bracket plate 23 having four bolt receiving apertures 24, for the reception of bolts 25 (FIG. 5) which are engaged with the frame F of a cotton picker.

The right hand plate 10 is provided with an inverted U-shaped guide including a horizontal upper portion 26 and opposite vertical legs 27 and a stop bar 28 overlies the plate 10 and has an end portion thereof projecting outwardly of the straight edge 12 of the plate and which end portion is provided with a pair of apertures 29 for the reception of bolts for securement of the bar to the picker frame.

The stop bar 28 in cooperation with the guide 26, 27 provides for limited swinging movement of plate 10 since one edge of the bar engages one or the other of the legs 27 of the U-shaped guide upon swinging movement of the plate 10 about the axis of bolt 21.

Each of the bands 15 terminates at the forward end thereof in a terminal curved portion $15^a$ to each of which is secured one end of a spring 30 whose opposite end is secured to the picker frame F. The springs 30 impose tension on the plates 10 and 11 whereby same are normally in contact at the rear straight portions 13 but which are capable of separation against the tension of the springs.

As is indicated in FIG. 5 the improved attachment is secured to a cotton picking head in a position beneath the cotton guide fingers G and mainly in advance of the cotton picking spindles S.

Having set forth the construction of the improved attachment its operation is as follows.

As the cotton stalks enter the forward end of the picker head, they strike the adjacent curved edges of the plates and are guided into the picker head, while all grass, weeds and other extraneous material are forced downwardly by the bands 15 and pass underneath the plates 10 and 11.

It is to be particularly observed that the grass, and weeds after having been forced downwardly, are confined beneath the plates 10 and 11 whereby same are positively retained against passage into the cotton picker head.

Accordingly, the plates 10 and 11 effectively seal the bottom of the picker head so that grass, leaves, dirt and other foreign material cannot get into the picker head. The plates 10 and 11 not only serve to pull the grass away from the cotton stalks so as to improve the sample, but same act as a safety means for protecting the cotton picking machine from damage through entry of foreign objects, such as pieces of wood, small farm implements, which may be lying on the ground.

What is claimed is:

1. A grass and weed deflecting attachment for a cotton picker including a frame, picking spindles and guide fingers; comprising a pair of plates disposed beneath said spindles and said guide fingers, said plates being pivotally supported by said frame at opposite sides laterally with respect to said spindles and said fingers and having adjacent edges including straight portions and curved portions, and means cooperating with said frame and said plates for yieldably retaining said straight portions in contact.

2. A grass and weed deflecting attachment for a cotton picker according to claim 1, wherein said straight edge portions are normally disposed in the center line of relative movement of cotton stalks in the operation of the picker, and said curved portions widely diverging from said straight portions for pressing down weeds and grass while guiding the cotton stalks into range of said spindles.

3. A grass and weed deflecting attachment according to claim 1, wherein the adjacent edges of the plates have a relatively wide vertically disposed band having its upper edge secured to the straight and curved edge of each plate.

4. A grass and weed deflecting attachment according to claim 1 together with cooperating means on said frame and one of said plates for limiting the pivotal movement thereof.

5. A grass and weed deflecting attachment according to claim 1 wherein said pivotal support of each of said plates comprises a bearing spindle secured to a respective plate and a cooperating spindle receiving bushing secured to said frame.

References Cited in the file of this patent

UNITED STATES PATENTS

| 515,031 | Turner | Feb. 20, 1894 |
| 722,421 | Campbell | Mar. 10, 1903 |
| 1,713,398 | Rountree | May 14, 1929 |
| 1,731,826 | Morava | Oct. 15, 1929 |
| 1,802,022 | Johnston et al. | Apr. 21, 1931 |
| 1,894,198 | Rust et al. | Jan. 10, 1933 |
| 2,489,963 | Henley | Nov. 29, 1949 |